US011641600B2

(12) United States Patent
Saker et al.

(10) Patent No.: US 11,641,600 B2
(45) Date of Patent: May 2, 2023

(54) BANDWIDTH THROTTLING IN A RADIO ACCESS NETWORK

(71) Applicant: Nokia Solutions and Networks Oy, Espoo (FI)

(72) Inventors: Daniel Saker, La Ville du Bois (FR); Goutam Sinha, Saratoga, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 92 days.

(21) Appl. No.: 17/214,435

(22) Filed: Mar. 26, 2021

(65) Prior Publication Data
US 2022/0312269 A1   Sep. 29, 2022

(51) Int. Cl.
| | |
|---|---|
| *H04W 28/08* | (2023.01) |
| *H04W 4/24* | (2018.01) |
| *H04W 28/02* | (2009.01) |
| *H04W 28/082* | (2023.01) |
| *H04M 15/00* | (2006.01) |

(52) U.S. Cl.
CPC ....... *H04W 28/0925* (2020.05); *H04M 15/66* (2013.01); *H04M 15/81* (2013.01); *H04W 4/24* (2013.01); *H04W 28/0284* (2013.01); *H04W 28/085* (2013.01)

(58) Field of Classification Search
CPC .............. H04W 28/0925; H04W 4/24; H04W 28/0284; H04W 28/085; H04M 15/66; H04M 15/81
See application file for complete search history.

(56) References Cited

U.S. PATENT DOCUMENTS

| | | | |
|---|---|---|---|
| 10,631,030 B2 * | 4/2020 | Lee | H04N 21/2662 |
| 11,310,731 B1 * | 4/2022 | Feder | H04W 36/32 |
| 2012/0082100 A1 * | 4/2012 | Ahmadi | H04J 3/02 370/329 |

(Continued)

FOREIGN PATENT DOCUMENTS

| | | | |
|---|---|---|---|
| EP | 2512176 A1 | 10/2012 | |
| WO | WO-2013170347 A1 * | 11/2013 | ......... H04L 41/0816 |

(Continued)

OTHER PUBLICATIONS

European Search Report; Application EP22162174; dated Jul. 14, 2022.

(Continued)

*Primary Examiner* — Mehmood B. Khan
(74) *Attorney, Agent, or Firm* — Duft & Bornsen, PC

(57) ABSTRACT

Systems, methods, and software of managing bandwidth allocated to User Equipment (UE). In one embodiment, a bandwidth management system collects cell load information for a plurality of cells within a Radio Access Network (RAN), and processes the cell load information to determine a cell load status for each of the cells. The system performs bandwidth throttling for the UE by determining a location of the UE, identifying the cell load status for one or more cells in a region of the RAN corresponding with the location of the UE, determining whether the region of the RAN is overloaded based on the cell load status, and controlling a downgrade of bandwidth allocated to the UE in the RAN responsive to a determination that the region is overloaded.

20 Claims, 8 Drawing Sheets

(56) References Cited

U.S. PATENT DOCUMENTS

| | | | |
|---|---|---|---|
| 2014/0038549 A1* | 2/2014 | Lehane | H04W 4/24 |
| | | | 455/406 |
| 2014/0086052 A1 | 3/2014 | Cai et al. | |
| 2015/0245238 A1 | 8/2015 | Zhang | |
| 2015/0257116 A1* | 9/2015 | Frantti | H04W 60/06 |
| | | | 370/253 |
| 2016/0316388 A1* | 10/2016 | Rosen | H04W 28/0231 |
| 2017/0238275 A1* | 8/2017 | De Pasquale | H04W 64/006 |
| | | | 370/252 |
| 2019/0090246 A1* | 3/2019 | Jagannath | H04W 24/08 |
| 2019/0335342 A1* | 10/2019 | Jacinto | H04W 24/02 |
| 2022/0018668 A1* | 1/2022 | Klein | G01C 21/3469 |
| 2022/0086218 A1* | 3/2022 | Sabella | H04L 67/141 |
| 2022/0086729 A1* | 3/2022 | Shaw | H04W 36/36 |

FOREIGN PATENT DOCUMENTS

| | | | | |
|---|---|---|---|---|
| WO | WO-2014071784 A1 * | 5/2014 | | H04L 47/20 |
| WO | 2014146502 A1 | 9/2014 | | |
| WO | WO-2014149035 A1 * | 9/2014 | | H04W 28/0205 |
| WO | WO-2016059053 A1 * | 4/2016 | | H01Q 1/32 |
| WO | WO-2016059063 A1 * | 4/2016 | | H04B 7/15507 |
| WO | WO-2016119822 A1 * | 8/2016 | | H04L 41/00 |
| WO | WO-2022114925 A1 * | 6/2022 | | |

OTHER PUBLICATIONS

3GPP TS 28.532 v16.6.0 (Dec. 2020) Generic management services.
3GPP TS 28.550 v16.7.0 (Dec. 2020) Performance assurance.
3GPP TS 28.552 V17.1.0 (Dec. 2020) 5G performance measurements.
3GPP TS 28.554 v17.1.1 (Dec. 2020) 5G end to end Key Performance Indicators (KPI).
3GPP TS 32.401 v16.3.3 (Jul. 2020) Concept and requirements.
3GPP TS 32.402 v2.0.0 (Jun. 2001) Performance Measurements—GSM.
3GPP TS 32.403 v7.1.0 (Dec. 2005) Performance measurements—UMTS and combined UMTS/GSM.
3GPP TS 32.404 v16.0.0(Jul. 2020) Definitions and template.
3GPP TS 32.405 v16.0.0(Jul. 2020) Universal Terrestrial Radio Access Network (UTRAN).
3GPP TS 32.406 v16.0.0(Jul. 2020) Core Network (CN) Packet Switched (PS) domain.
3GPP TS 32.407 v16.0.0(Jul. 2020) UMTS and combined UMTS/GSM.
3GPP TS 32.408 v16.0.0 (Jul. 2020) Teleservice.
3GPP TS 32.409 V16.0.0 (Jul. 2020) IP Multimedia Subsystem (IMS).
3GPP TS 32.410 v16.0.0 (Jul. 2020) Key Performance Indicators (KPI) for UMTS and GSM.
3GPP TS 32.411 v16.0.0 (Jul. 2020) Requirements.
3GPP TS 32.412 v16.0.0 (Jul. 2020) Information Service (IS).
3GPP TS 32.413 v9.0.0 (Dec. 2009) Solution Set (SS).
3GPP TS 32.414 v6.1.0 (Sep. 2005) Common Management Information Protocol (CMIP) Solution Set (SS).
3GPP TS 32.415 v9.0.0 (Dec. 2009) extensible Markup Language (XML) definitions.
3GPP TS 32.416 v16.0.0 92020-07) Solution set (SS) definitions.
3GPP TS 32.425 v17.0.0 (Dec. 2020) Evolved Universal Terrestrial Radio Access Network (E-UTRAN).
3GPP TS 38.423 V16.4.0 (Jan. 2021) Xn application protocol (XnAP).
3GPP TS 38.473 V16.4.0 (Jan. 2021) F1 application protocol (F1AP).

* cited by examiner

BANDWIDTH THROTTLING IN A RADIO ACCESS NETWORK

TECHNICAL FIELD

This disclosure is related to the field of communication systems and, in particular, to Radio Access Networks (RAN).

BACKGROUND

A Radio Access Network (RAN) is part of a mobile communication system that interacts with mobile devices (e.g., User Equipment (UE)) via a radio access technology to connect the mobile devices with a core network to receive services. A RAN includes a plurality of base stations that provide coverage to mobile devices over a geographic area in the form of cells. Mobile devices provide subscribers access to a variety of types of data services offered by a service provider. Due to the variety of different mobile devices and the number of data services available to subscribers, the use of data services is likely to increase, especially when next generation (e.g., Fifth Generation (5G)) networks come online with improved speeds and connectivity. With the increase in subscribers having multiple devices and the ever-growing volume of applications and data services, resources of the RAN can become overloaded. Thus, service providers continue to look for ways of addressing scenarios where portions of a RAN become overloaded.

SUMMARY

Described herein is a system and associated method of managing bandwidth allocated to UEs in a RAN. A system as described herein is able to monitor a cell load status for the cells of the RAN, and identify which of the cells are or will be experiencing an overload condition. When a UE is located in a region or area of the RAN that is overloaded (i.e., one or more of the cells in the region are overloaded or will be overloaded based on scheduled traffic), the system is able to downgrade the bandwidth allocated to the UE in the RAN. Downgrading of bandwidth of UEs in this manner provides a technical benefit of preventing resources of the RAN in an overloaded region from being cannibalized by a few heavy users in that region.

One embodiment comprises a bandwidth management system that includes at least one processor and memory. The processor causes the bandwidth management system to collect cell load information for a plurality of cells within a RAN, and process the cell load information to determine a cell load status for each of the cells. The processor causes the bandwidth management system to perform bandwidth throttling for a UE of a user of the RAN by determining a location of the UE, identifying the cell load status for one or more of the cells in a region of the RAN corresponding with the location of the UE, determining whether the region of the RAN is overloaded based on the cell load status for the one or more of the cells in the region, and controlling a downgrade of bandwidth allocated to the UE in the RAN responsive to a determination that the region is overloaded.

In another embodiment, the processor causes the bandwidth management system to generate a bandwidth throttling request requesting a change to a policy for the UE to downgrade the bandwidth allocated to the UE, and transmit the bandwidth throttling request to a policy control element.

In another embodiment, the bandwidth management system is implemented in a charging system, and the processor causes the bandwidth management system to perform the bandwidth throttling for the UE responsive to receiving a charging request for the UE.

In another embodiment, the processor causes the bandwidth management system to perform the bandwidth throttling for the UE responsive to receiving an initial charging request for a new data session of the UE.

In another embodiment, the processor causes the bandwidth management system to perform the bandwidth throttling for the UE responsive to receiving an interim charging request for an ongoing data session of the UE.

In another embodiment, the processor causes the bandwidth management system to trigger a tariff discount for the UE responsive to a determination that the region is underloaded.

In another embodiment, the charging system comprises a 5G Charging Function (CHF).

In another embodiment, the charging system comprises an Online Charging System (OCS).

In another embodiment, the charging system comprises an Offline Charging System (OFCS).

Another embodiment comprises a method of managing bandwidth allocated to a UE. The method comprises collecting cell load information for a plurality of cells within a RAN, and processing the cell load information to determine a cell load status for each of the cells. The method further comprises performing bandwidth throttling for the UE of a user of the RAN by determining a location of the UE, identifying the cell load status for one or more of the cells in a region of the RAN corresponding with the location of the UE, determining whether the region of the RAN is overloaded based on the cell load status for the one or more of the cells in the region, and controlling a downgrade of bandwidth allocated to the UE in the RAN responsive to a determination that the region is overloaded.

In another embodiment, controlling the downgrade of bandwidth allocated to the UE comprises generating a bandwidth throttling request requesting a change to a policy for the UE to downgrade the bandwidth allocated to the UE, and transmitting the bandwidth throttling request to a policy control element.

In another embodiment, the bandwidth throttling is performed at a bandwidth management system that is implemented in a charging system, and performing the bandwidth throttling comprises performing the bandwidth throttling for the UE responsive to receiving a charging request for the UE.

In another embodiment, performing the bandwidth throttling comprises performing the bandwidth throttling for the UE responsive to receiving an initial charging request for a new data session of the UE.

In another embodiment, performing the bandwidth throttling comprises performing the bandwidth throttling for the UE responsive to receiving an interim charging request for an ongoing data session of the UE.

In another embodiment, the method further comprises triggering a tariff discount for the UE responsive to a determination that the region is underloaded.

Another embodiment comprises a bandwidth management system comprising a means for collecting cell load information for a plurality of cells within a RAN, and a means for processing the cell load information to determine a cell load status for each of the cells. The bandwidth management system further comprises a means for performing bandwidth throttling for a UE of a user of the RAN by determining a location of the UE, identifying the cell load status for one or more of the cells in a region of the RAN corresponding with the location of the UE, determining whether the region of the RAN is overloaded based on the cell load status for the one or more of the cells in the region, and controlling a downgrade of bandwidth allocated to the UE in the RAN responsive to a determination that the region is overloaded.

Other embodiments may include computer readable media, other systems, or other methods as described below.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
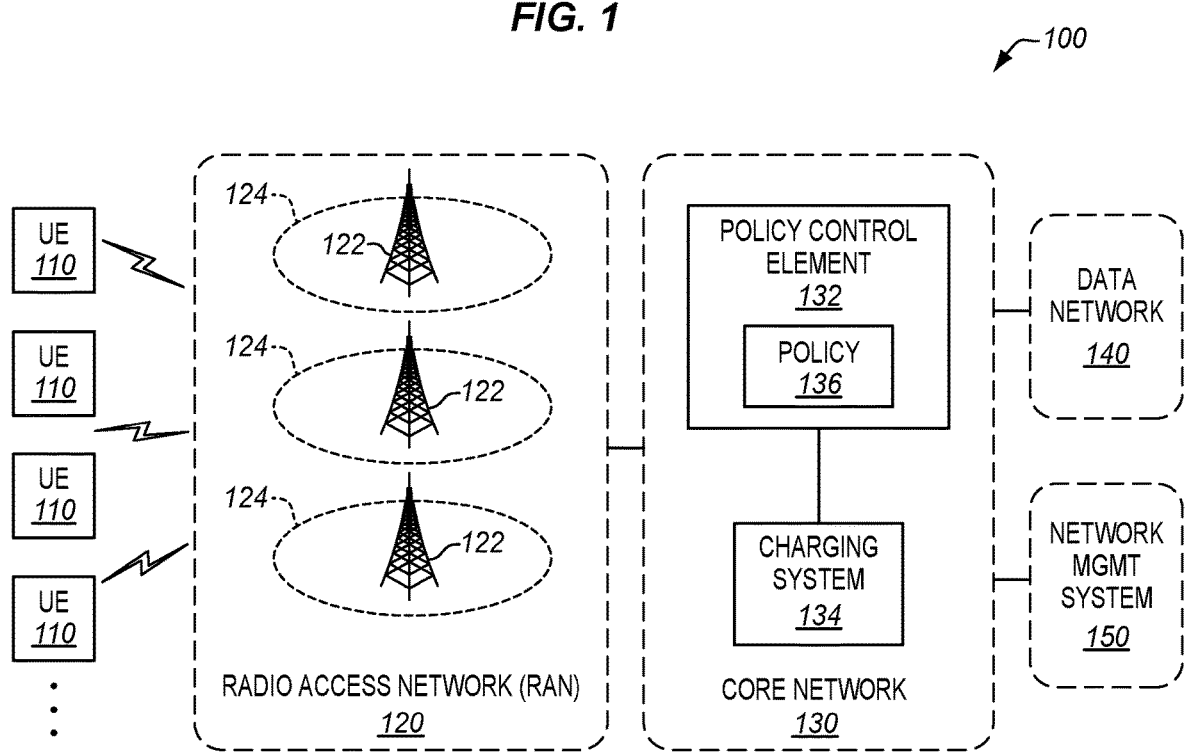
FIG. 1 illustrates a communication system in an illustrative embodiment.

FIG. 1 illustrates a communication system 100 in an illustrative embodiment. Communication system 100 is a cellular network or mobile telecommunication network of a carrier, where the last link is wireless. Communication system 100 is a Third Generation (3G) network, a Fourth Generation (4G) network (e.g., a Long-Term Evolution (LTE) network), a next-generation network (e.g., 5G or later), or another type of network. Communication system 100 provides voice, data, or other communication services to a plurality of devices, referred to herein as User Equipment (UE) 110. UEs 110 may be enabled for voice services, data services, Machine-to-Machine (M2M) or Machine Type Communications (MTC) services, and/or other services. A UE 110 may be an end user device such as a mobile phone (e.g., smart phone) or mobile device, a tablet or PDA, a computer with a mobile broadband adapter, etc. A UE 110 may be operated by a user or subscriber of communication system 100, so the terms "UE", "user", and "subscriber" may be used interchangeably.

Communication system 100 includes one or more Radio Access Networks (RAN) 120 that communicate with UEs 110 over a radio interface. RAN 120 may support Evolved-UMTS Terrestrial Radio Access Network (E-UTRAN) access, Wireless Local Area Network (WLAN) access, new Radio Access Technologies (RAT), etc. As an example, RAN 120 may comprise an E-UTRAN or Next Generation RAN (NG-RAN). RAN 120 includes a plurality of base stations 122 that are dispersed over a geographic area. A base station 122 comprises an entity that uses radio communication technology to communicate with a UE 110, and interface the UE 110 with a core network 130. Base station 122 includes equipment configured to interface with UEs 110 via the air interface, such as antennas, transmitters, receivers, etc., and equipment configured to interface with core network 130, such as routers, controllers, etc. Each base station 122 provides radio coverage to a cell 124 (or multiple cells). One or more of base stations 122 may communicate on the licensed spectrum or via 3GPP access, and one or more of the base stations 122 may communicate on an unlicensed spectrum or non-3GPP access. In one embodiment, one or more of base stations 122 may comprise an Evolved-NodeB (eNodeB) of an E-UTRAN. In another embodiment, one or more of base stations 122 may comprise a gNodeB (NR base stations) and/or ng-eNodeB (LTE base stations supporting a 5G Core Network) of an NG-RAN.

Core network 130 is the central part of communication system 100 that interconnects RAN 120 with a data network 140. One example of core network 130 is the Evolved Packet Core (EPC) network as suggested by the 3GPP for LTE. Another example of core network 130 is a 5G core network as suggested by the 3GPP. Core network 130 is able to access data network 140 to provide data services to UE 110, such as web browsing, online gaming, streaming video, streaming audio, etc. Data network 140 may be an operator external public or private data network, or an intra-operator data network (e.g., for IMS services). One example of data network 140 is the Internet.

Core network 130 includes a plurality of network elements or network functions (NF), which may comprise servers, devices, equipment (including hardware), a software instance running on dedicated hardware, a virtualized function instantiated on an appropriate platform (e.g., a cloud infrastructure), etc. In this embodiment, core network 130 includes a policy control element 132 and a charging system 134. Policy control element 132 comprises a device, component, or module (including hardware) configured to handle policy decisions for data sessions established over core network 130, which may also be referred to as making a Policy and Charging Control (PCC) decision. Policy control element 132 manages the policy 136 (or policy rules) for each UE/subscriber, and determines the parameter settings for sessions based on the policy 136. For example, policy control element 132 may determine the Quality of Service (QoS) settings for a session of a user based the policy 136 provisioned for the user, such as bandwidth (e.g., guaranteed bit rate and maximum bit rate), priority, etc. Examples of policy control element 132 are a Policy and Charging Rules Function (PCRF) and a Policy Control Function (PCF). Charging system 134 comprises a device, component, or module (including hardware) configured to perform charging for sessions of users. Charging system 134 may comprise an Online Charging System (OCS) configured to perform online charging, an Offline Charging System (OFCS) configured to perform offline charging, a Charging Function (CHF) in 5G that supports converged online and offline charging, or another type of charging system.

Communication system 100 further includes a network management system (NMS) 150. Network management system 150 is a system that monitors, maintains, and manages RAN 120 and/or core network 130, and provides functionality for a network operator to view and manage the operation of RAN 120 and/or core network 130. Network management system 150 may include a performance management (PM) sub-system configured to collect performance indicators or metrics (i.e., Key Performance Indicators (KPI)) from RAN 120 and/or core network 130. Network management system 150 may include a configuration management (CM) sub-system configured to monitor, update, and report network configuration parameters to RAN 120 and/or core network 130.

Figure 2:
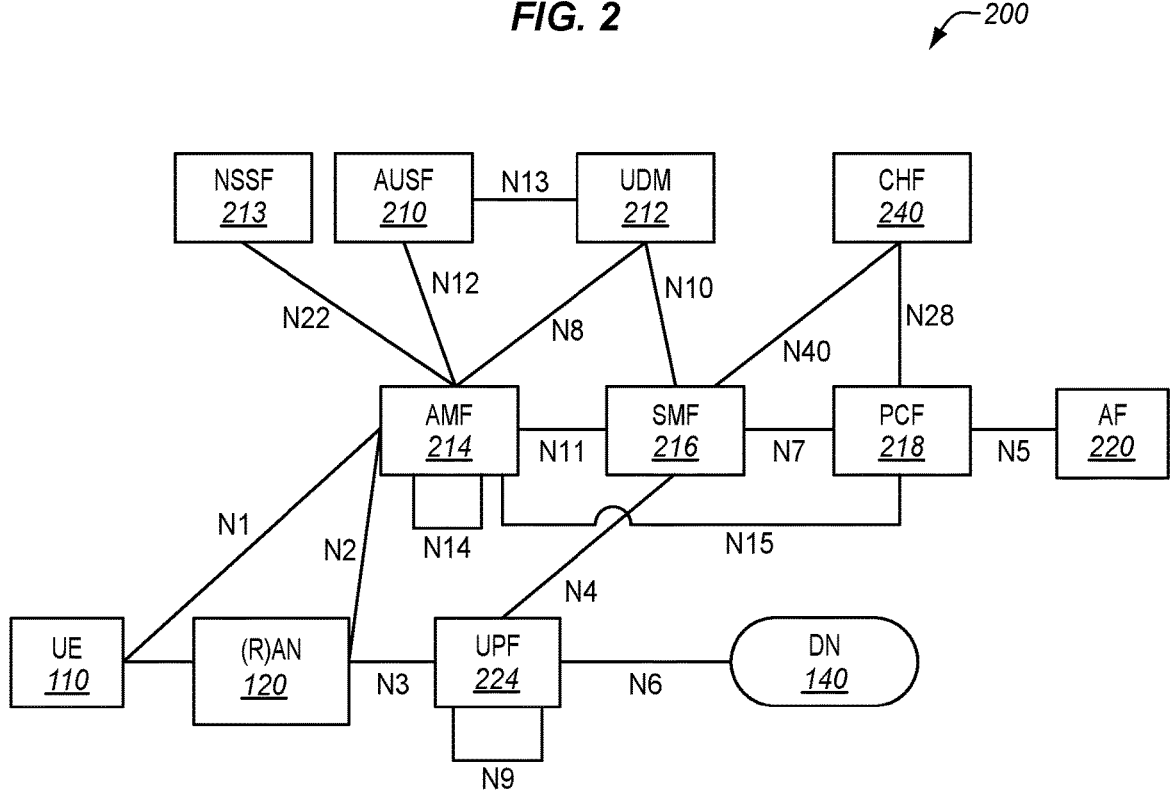
FIG. 2 illustrates a non-roaming architecture of a next generation network in an illustrative embodiment.

In one embodiment, communication system 100 may represent a next generation network (e.g., 5G network). FIG. 2 illustrates a non-roaming architecture 200 of a next generation network in an illustrative embodiment. The architecture in FIG. 2 is a reference point representation, as is further described in 3GPP TS 23.501 (v16.7.0), which is incorporated by reference as if fully included herein. The control plane of architecture 200 includes an Authentication Server Function (AUSF) 210, a Unified Data Management function (UDM) 212, a Network Slice Selection Function (NSSF) 213, an Access and Mobility Management Function (AMF) 214, a Session Management Function (SMF) 216, a Policy Control Function (PCF) 218, an Application Function (AF) 220, and a Charging Function (CHF) 240. The user plane of architecture 200 includes one or more User Plane Functions (UPF) 224 that communicate with a Data Network (DN) 140. A (Radio) Access Network ((R)AN) 120 and UE 110 are able to access the control plane and the user plane of the core network. (R)AN 120 is a type of communication network where the last link to end user devices (e.g., UE) is wireless.

AUSF 210 is configured to support authentication of UE 110. UDM 212 is configured to store subscription data/information for UE 110. UDM 212 may store three types of user data: subscription, policy, and session-related context (e.g., UE location). AMF 214 is configured to provide UE-based authentication, authorization, mobility management, etc. SMF 216 is configured to provide the following functionality: session management (SM), UE Internet Protocol (IP) address allocation and management, selection and control of UPF 224, termination of interfaces towards PCF 218, control part of policy enforcement and QoS, lawful intercept, termination of SM parts of NAS messages, Downlink Data Notification (DNN), roaming functionality, handle local enforcement to apply QoS for Service Level Agreements (SLAs), charging data collection and charging interface, etc. If UE 110 has multiple sessions, different SMFs may be allocated to each session to manage them individually and possibly provide different functionalities per session. PCF 218 is configured to support a unified policy framework to govern network behavior, and to provide policy rules to control plane functions for QoS enforcement, charging, access control, traffic routing, etc. AF 220 provides information on a packet flow to PCF 218. Based on the information, PCF 218 is configured to determine policy rules about mobility and session management to make AMF 214 and SMF 216 operate properly. CHF 240 is configured to provide charging for sessions/services, and supports converged online and offline charging.

UPF 224 supports various user plane operations and functionalities as part of a service, such as packet routing and forwarding, traffic handling (e.g., QoS enforcement), an anchor point for Intra-RAT/Inter-RAT mobility (when applicable), packet inspection and policy rule enforcement, lawful intercept (UP collection), traffic accounting and reporting, etc. DN 140 is not part of the core network, and provides Internet access, operator services, 3rd party services, etc.

Architecture 200 includes the following reference points. The N1 reference point is implemented between UE 110 and AMF 214. The N2 reference point is implemented between (R)AN 120 and AMF 214. The N3 reference point is implemented between (R)AN 120 and UPF 224. The N4 reference point is implemented between the SMF 216 and UPF 224. The N5 reference point is implemented between PCF 218 and AF 220. The N6 reference point is implemented between UPF 224 and DN 140. The N7 reference point is implemented between the SMF 216 and PCF 218. The N8 reference point is implemented between UDM 212 and AMF 214. The N9 reference point is implemented between two UPFs 224. The N10 reference point is implemented between UDM 212 and SMF 216. The N11 reference point is implemented between AMF 214 and SMF 216. The N12 reference point is implemented between AMF 214 and AUSF 210. The N13 reference point is implemented between UDM 212 and AUSF 210. The N14 reference point is implemented between two AMFs. The N15 reference point is implemented between PCF 218 and AMF 214 in the case of a non-roaming scenario. The N22 reference point is implemented between NSSF 213 and AMF 214. The N28 reference point is implemented between CHF 240 and PCF 218, and the N40 reference point is implemented between CHF and SMF 216.

Figure 3:
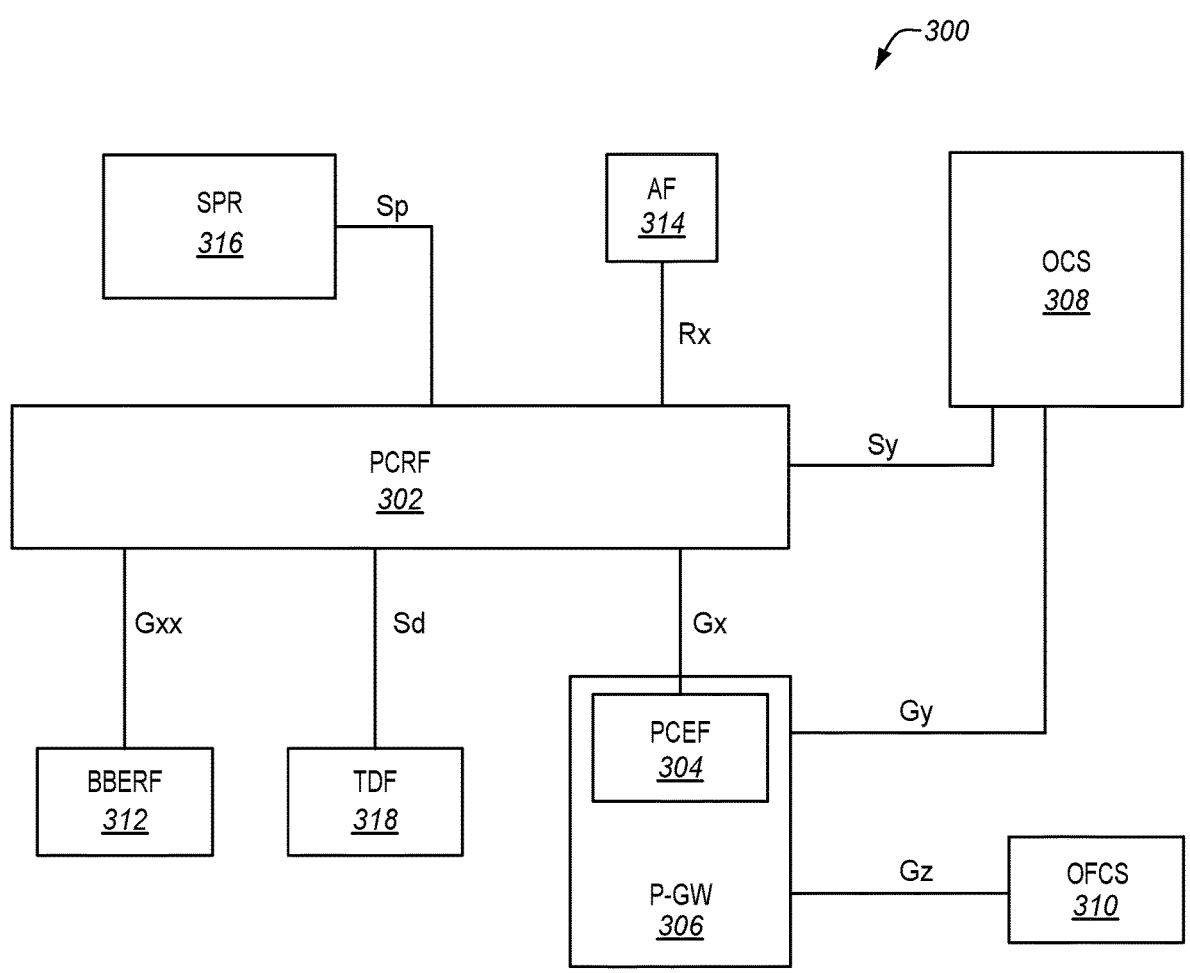
FIG. 3 illustrates a PCC architecture for an LTE network in an illustrative embodiment.

In another embodiment, communication system 100 may represent an LTE network. FIG. 3 illustrates a PCC architecture 300 for an LTE network in an illustrative embodiment. PCC architecture 300 includes a Policy and Charging Rules Function (PCRF) 302 and a Policy and Charging Enforcement Function (PCEF) 304 that together provide a PCC solution. PCRF 302 encompasses policy control decision and flow-based charging control functionalities. Thus, PCRF 302 is a node or entity of the network that formulates PCC rules for services requested by a user, which is referred to herein as making a PCC decision. PCRF 302 may have a policy engine (not shown) that makes the PCC decision based on policy and/or charging rules defined for the user. PCEF 304 encompasses service data flow detection, policy enforcement, and flow-based charging functionalities. Thus, PCEF 304 is a node that enforces the PCC rules for services requested by an end user. For example, PCEF 304 may set up bearer connections for the service, modify existing bearer connections, ensure that only authorized service data flows are established, ensure that QoS limits are not exceeded, and the like. PCEF 304 is typically implemented in a gateway between the user and a data network, such as Packet Data Network Gateway (P-GW) 306 in an EPC network.

PCC architecture 300 further includes an OCS 308, an OFCS 310, a Bearer Binding and Event Reporting Function (BBERF) 312, an Application Function (AF) 314, a Subscriber Profile Repository (SPR) 316, and a Traffic Detection Function (TDF) 318. OCS 308 provides online charging for services/sessions accessed by users. In addition, OCS 308 stores online charging rules/plans for the end users which PCRF 302 may use when making a PCC decision. For example, online charging rules may define that a user is a prepaid subscriber, and may define tariffs for different services requested by the user. OCS 308 interfaces with PCRF 302 via an Sy reference point or another suitable reference point to exchange charging rules/plans with OCS 308, and also interfaces with P-GW 306 via a Gy reference point or another suitable reference point. OFCS 310 provides offline charging for services/sessions accessed by end users. OFCS 310 interfaces with P-GW 306 via a Gz reference point or another suitable reference point.

AF 314 is an element offering applications that require dynamic policy and/or charging control. AF 314 communicates with PCRF 302 to transfer dynamic session information used for PCC decisions, and to receive session-specific information and notifications about bearer level events. For example, AF 314 may provide IP-addresses, port numbers, bit rates, delay sensitivity, etc., for requested services to PCRF 302. PCRF 302 may then use this information when making the PCC decision. AF 314 communicates with PCRF 302 via an Rx reference point or other suitable protocol interface. One example of AF 314 is a Proxy-Call Session Control Function (P-CSCF) of the IP Multimedia Subsystem (IMS).

SPR 316 stores subscriber profiles for end users. The subscriber profiles may include policy rules (and possibly charging rules) that are used by PCRF 302 to make a PCC decision. The policy rules govern which network services the end user is allowed to access, the bandwidth level that is provided, the time(s) when the services are allowed, how long the services are allowed, etc. The policy rules and charging rules together are referred to herein as a service plan (or PCC plan) for a user (or subscriber). SPR 316 interfaces with PCRF 302 via a Diameter Sp interface or any other protocol used to exchange policy rules with PCRF 302.

TDF 318 is a functional entity that performs application detection, and reports detected applications and their service data flow descriptions to PCRF 302. TDF 318 may also perform gating, redirection, and bandwidth limitation if a service data flow description cannot be provided to PCRF 302. TDF 318 interfaces with PCRF 302 via a Diameter Sd interface or any other suitable protocol interface to send the traffic data (real-time or history) for PCC decisions.

A network operator of communication system 100 or another telecommunication network may want to trigger bandwidth/speed throttling in overloaded regions of a RAN to avoid bandwidth being cannibalized by heavy users and enable better bandwidth distribution and usage by a large number of users in these regions. For example, sporting events, concerts, parades, protests, and/or other types of events may overload the available capacity on one or more cells of a RAN. To address this and/or other problems, a bandwidth management system may be implemented in communication system 100. At a high level, a bandwidth management system is able to downgrade the bandwidth allocated to a UE 110 when the UE 110 is located in a region of the RAN 120 that is experiencing an excessive load. One technical benefit of bandwidth throttling is that the available network resources in congested or overloaded regions of the RAN 120 may be distributed in an effective and fair manner to a larger number of users.

Figure 4:
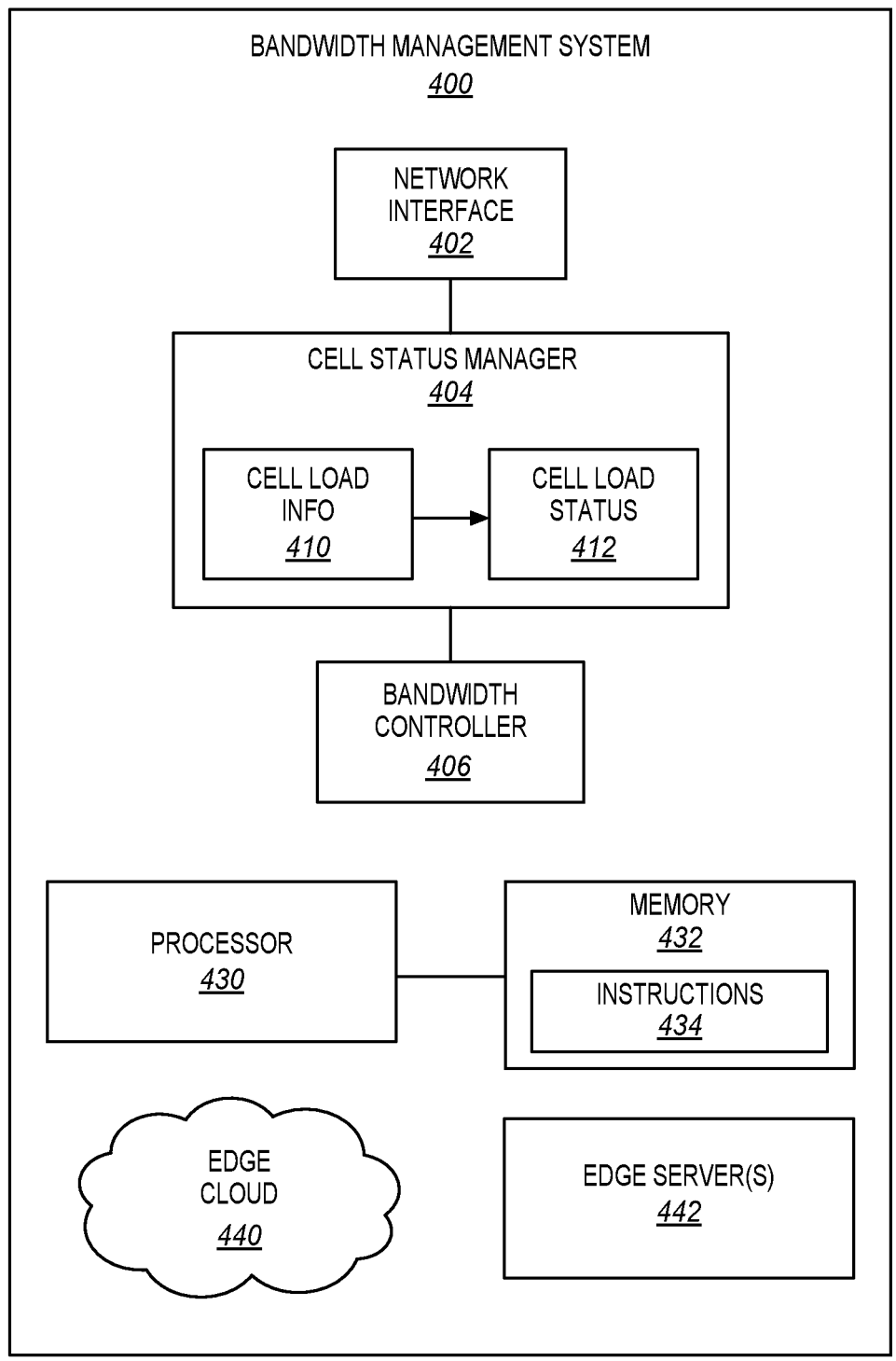
FIG. 4 is a block diagram of a bandwidth management system in an illustrative embodiment.

FIG. 4 is a block diagram of bandwidth management system 400 in an illustrative embodiment. Bandwidth management system 400 comprises a network node, server, circuitry, logic, hardware, means, etc., configured to control or manage the bandwidth available or provided to UEs 110 served by a RAN 120. In this embodiment, bandwidth management system 400 includes the following subsystems: a network interface component 402, a cell status manager 404, and a bandwidth controller 406. Network interface component 402 is a hardware component that exchanges messages, signaling, or packets with other elements, such as RAN 120, network management system 150, core network 130, and/or other systems. For example, network interface component 402 may receive performance metrics/indicators regarding cells 124 of RAN 120 from network management system 150, from core network 130, or directly from RAN 120. Network interface component 402 may operate using a variety of protocols or reference points, including the Sy reference point, the Rx reference point, the Sp reference point, and/or other reference points that use Diameter base protocol, the N28 reference point, the N40 reference point, the N15 reference point, the N7 reference point defined for next-generation networks, and/or other reference points.

Cell status manager 404 comprises circuitry, logic, hardware, means, etc., configured to gather, obtain, or otherwise collect cell load information 410 for a RAN 120, and determine the cell load status 412 of cells 124 in the RAN 120 based on the cell load information 410. Cell load is a measure of resource usage of a cell, such as with respect to the available limits of the resources. The cell load status 412 is therefore a measure or level of the load in a cell 124. For example, the cell load status 412 may be an integer between "0" and "9" indicating the load level in a cell 124, may be a classification such as "overloaded", "normal", and "underloaded" indicating the load level in a cell 124, or another type of value. Cell status manager 404 may fetch the cell load information 410 from RAN measurements (e.g., counters providing information about cell load, counters estimating potential traffic in the cell 124, counters providing a number of connected devices in the cell 124, etc.). This may be done through a file-based mechanism (e.g., FTP interface) to fetch the cell load information 410, via an API interface (e.g., RESTful) to access the cell load information 410 from RAN 120, from a RAN monitoring system (e.g., network management system 150), or from an AMF, or through other means. Cell status manager 404 may store the cell load information 410 and cell load status 412 in a data store, a database, etc.

Bandwidth controller 406 comprises circuitry, logic, hardware, means, etc., configured to downgrade the bandwidth allocated to a UE 110 when the UE 110 is located in a region of the RAN 120 that is congested or overloaded. Bandwidth controller 406 determines whether the region of the RAN 120 is congested or overloaded based on the cell load status 412 of a single cell 124 or multiple cells 124 in the region of the RAN 120. Bandwidth controller 406 may downgrade the bandwidth allocated to the UE 110 by transmitting a bandwidth throttling request or the like to a policy control element 132 of the core network 130 (e.g., PCF 218, PCRF 302, etc.).

Bandwidth management system 400 may include various other components or sub-systems not specifically illustrated in FIG. 4.

One or more of the subsystems of bandwidth management system 400 may be implemented on a hardware platform comprised of analog and/or digital circuitry. One or more of the subsystems of bandwidth management system 400 may be implemented on a processor 430 that executes instructions 434 stored in memory 432. Processor 430 comprises an integrated hardware circuit configured to execute instructions 434, and memory 432 is a non-transitory computer readable storage medium for data, instructions 434, applications, etc., and is accessible by processor 430. In other alternatives, one or more of the subsystems of bandwidth management system 400 may be implemented on an edge cloud 440, one or more edge servers 442, or another architecture (e.g., Multi-access Edge Computing (MEC) architecture).

Figure 5:
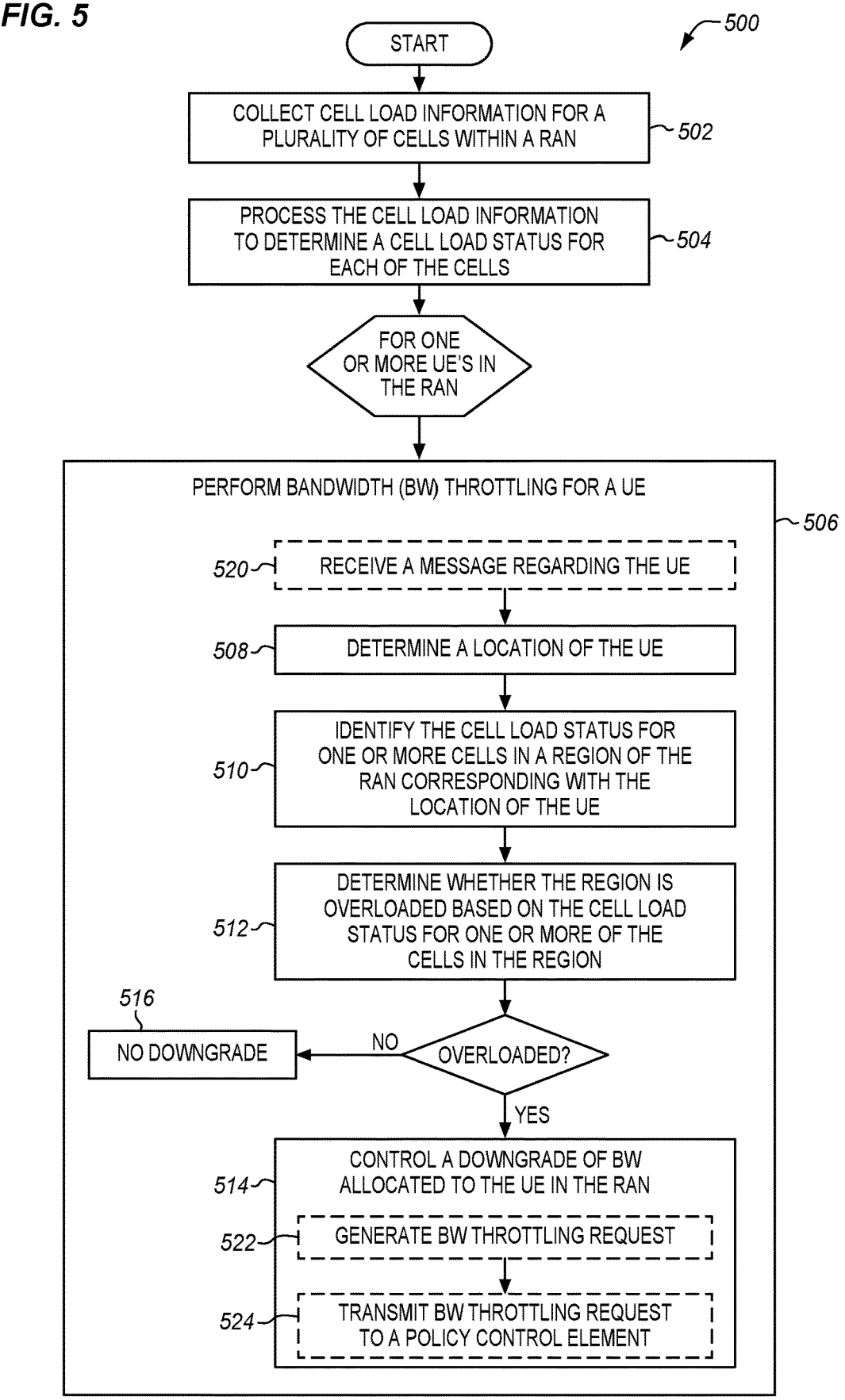
FIG. 5 is a flow chart illustrating a method of managing bandwidth allocated to a UE in an illustrative embodiment.

FIG. 5 is a flow chart illustrating a method 500 of managing bandwidth allocated to a UE 110 in an illustrative embodiment. The steps of method 500 will be described with reference to bandwidth management system 400 in FIG. 4, but those skilled in the art will appreciate that method 500 may be performed in other systems. The steps of the flow charts described herein are not all inclusive and may include other steps not shown, and the steps may be performed in an alternative order.

Cell status manager 404 receives, gathers, obtains, or collects cell load information 410 for a plurality of cells 124 within a RAN 120 (step 502). For example, cell status manager 404 may receive performance metrics/indicators (e.g., from network management system 150), traffic reports or logs, or other messages or information for RAN 120 through network interface component 402. The cell load information 410 may indicate a number of active or connected devices in a cell 124 (e.g., number of RRC connections), Uplink (UL) and/or Downlink (DL) usage for active or connected devices in a cell 124, Physical Resource Block (PRB) utilization in a cell 124, etc. The cell load information 410 may indicate or include IP latency measurements, IP throughput measurements in DL and UL, scheduled IP throughput in DL and UL, etc. The cell load information 410 may be pushed to cell status manager 404 periodically (e.g., every five minutes) or in real-time, or cell status manager 404 may request the cell load information 410 periodically, in response to an event, etc. Cell status manager 404 then stores the cell load information 410, such as in a database.

Cell status manager 404 processes the cell load information 410 to determine a cell load status 412 for each of the cells 124 (step 504). As described above, the cell load status 412 is a measure or level of the load in a cell 124. In one embodiment, cell status manager 404 may determine the cell load status 412 based on an average number of connected devices (e.g., UEs) in the cell 124 versus a maximum number of connected devices provisioned for the cell 124. In another embodiment, cell status manager 404 may determine the cell load status 412 based on an average sum of DL usage for connected devices in the cell 124 versus a maximum sum of DL usage for a maximum number of connected devices in the cell 124. In yet another embodiment, cell status manager 404 may determine the cell load status 412 based on an average sum of UL usage for connected devices in the cell 124 versus a maximum sum of UL usage for a maximum number of connected devices in the cell 124. Cell status manager 404 may use a combination of the above parameters or other parameters to determine the cell load status 412 for the cells 124. Cell status manager 404 may then store the cell load status 412 for the cells 124, such as in a database. The cell load status 412 may be updated by cell status manager 404 as desired.

Bandwidth controller 406 performs bandwidth throttling for a UE 110 attached to or served by RAN 120 based on the cell load status 412 of the cells 124 (step 506). Bandwidth controller 406 may initiate bandwidth throttling for this UE 110 in response to a trigger condition. For example, bandwidth controller 406 may receive a message regarding the UE 110 (optional step 520), such as a request for a new session or service, a charging request, etc. However, bandwidth throttling may be triggered in other ways in other embodiments.

Figure 6:
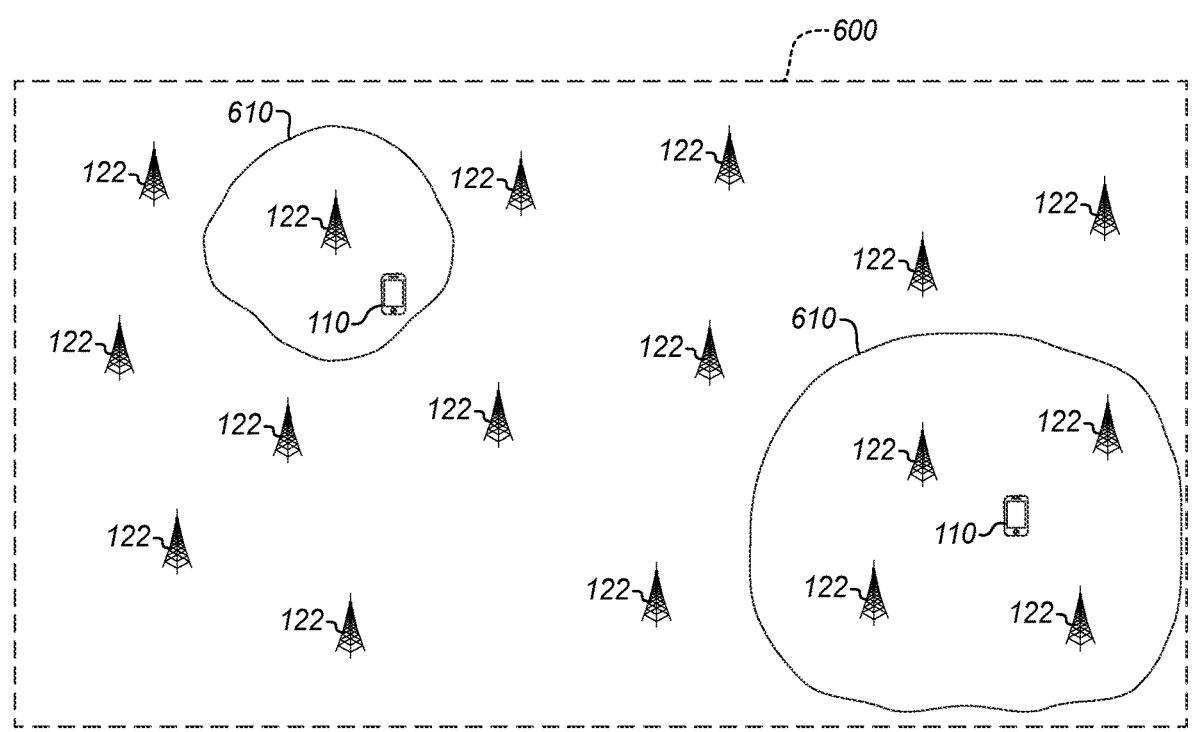
FIG. 6 illustrates a geographic area served by a RAN in an illustrative embodiment.

To perform bandwidth throttling, bandwidth controller 406 determines a location of the UE 110 (step 508). For example, bandwidth controller 406 may query a location database or the like (through network interface component 402) for location information of the UE 110, may process a message or signaling received regarding the UE 110 to identify a location of the UE 110, or obtain the location of the UE 110 in another manner. Bandwidth controller 406 identifies the cell load status 412 for one or more cells 124 in a region of the RAN 120 corresponding with the location of the UE 110 (step 510). FIG. 6 illustrates a geographic area 600 served by RAN 120 in an illustrative embodiment. This geographic area 600 includes a plurality of base stations 122, and although not shown, each of the base stations 122 forms one or more cells 124. Bandwidth controller 406 may determine a region 610 of the RAN 120 corresponding with the location of the UE 110. For example, a region 610 of interest may correspond with the location of a sporting event, concert, parade, protest, and/or other type of event. A region 610 of interest may include a single cell 124 of RAN 120 in one embodiment. For example, the leftmost region 610 illustrated in FIG. 6 encompasses a single cell 124 of RAN 120 (provided by a single base station 122). In another embodiment, a region 610 of interest may include multiple cells 124 of RAN 120, such as a tracking area of the UE 110, a campus, a city, etc. For example, the rightmost region 610 illustrated in FIG. 6 encompasses multiple cells 124 of RAN 120 (provided by multiple base stations 122). Bandwidth controller 406 identifies one or more of the cells 124 located within the determined region 610, and identifies the cell load status 412 for a cell 124 or cells 124 found to be within the determined region 610.

In FIG. 5, bandwidth controller 406 determines whether the region 610 of the RAN 120 corresponding with the location of the UE 110 is overloaded based on the cell load status 412 for one or more of the cells 124 in the region 610 (step 512). A region 610 is considered overloaded or in an overload condition when the load on one or more cells 124 in the region 610 exceeds or will exceed a threshold. Assume, for one example, that region 610 includes a single cell 124. Bandwidth controller 406 may identify the cell load status 412 for the cell 124 as a load level (e.g., integer between "1-9"), as a classification (e.g., "overloaded", "normal", or "underloaded"), or as another value. When the load level of the cell 124 exceeds an overload threshold, the classification of the cell 124 indicates "overloaded", or cell 124 is otherwise indicated as overloaded, bandwidth controller 406 may determine that region 610 is overloaded. Assume, for another example, that region 610 includes multiple cells 124. Bandwidth controller 406 may identify the cell load status 412 for each of the cells 124 in the region 610. In one embodiment, bandwidth controller 406 may determine that region 610 is overloaded when any one of the cells 124 in the region 610 has a load level that exceeds the overload threshold, has a classification of "overloaded", or is otherwise indicated as overloaded. In another embodiment, bandwidth controller 406 may determine that region 610 is overloaded when a threshold number or threshold percentage of the cells 124 in the region 610 is indicated as overloaded.

Bandwidth controller 406 controls a downgrade of bandwidth allocated to the UE 110 in the RAN 120 responsive to a determination that the region 610 is overloaded (step 514). Thus, the bandwidth allocated to the UE 110 is throttled when located in the overloaded region 610. When region 610 is not overloaded, bandwidth controller 406 may not downgrade the bandwidth allocated to the UE 110 (step 516).

Bandwidth controller 406 may control the downgrade of bandwidth in a variety of ways. In one embodiment, bandwidth controller 406 may generate a bandwidth throttling request requesting a change to a policy 136 for the UE 110 to downgrade the bandwidth allocated to the UE 110 (optional step 522), and transmit the bandwidth throttling request to a policy control element 132 in the core network 130 through network interface component 402 (optional step 524). For example, bandwidth controller 406 may transmit the bandwidth throttling request to a PCF 218 of a next-generation network, to a PCRF 302 of an LTE network, etc. In response to the bandwidth throttling request, the policy control element 132 may change the policy 136 for the UE 110 or make a policy decision so that the bandwidth allocated to the UE 110 is reduced.

Bandwidth controller 406 may consider other criteria in determining whether to downgrade bandwidth allocated to the UE 110, which is configurable by the network operator. For example, the criteria may include whether the user of the UE 110 belongs to a specific subscriber profile, whether the service requested by the user belongs to specific category (based on rating group and/or service identifier), whether the UE 110 is allocated a specific network slice, whether the user's data usage has reached a defined threshold, etc. Any combination of the above criteria or other criteria may be considered by bandwidth controller 406 in determining whether to downgrade bandwidth allocated to the UE 110 when the region 610 is considered overloaded.

Figure 7:
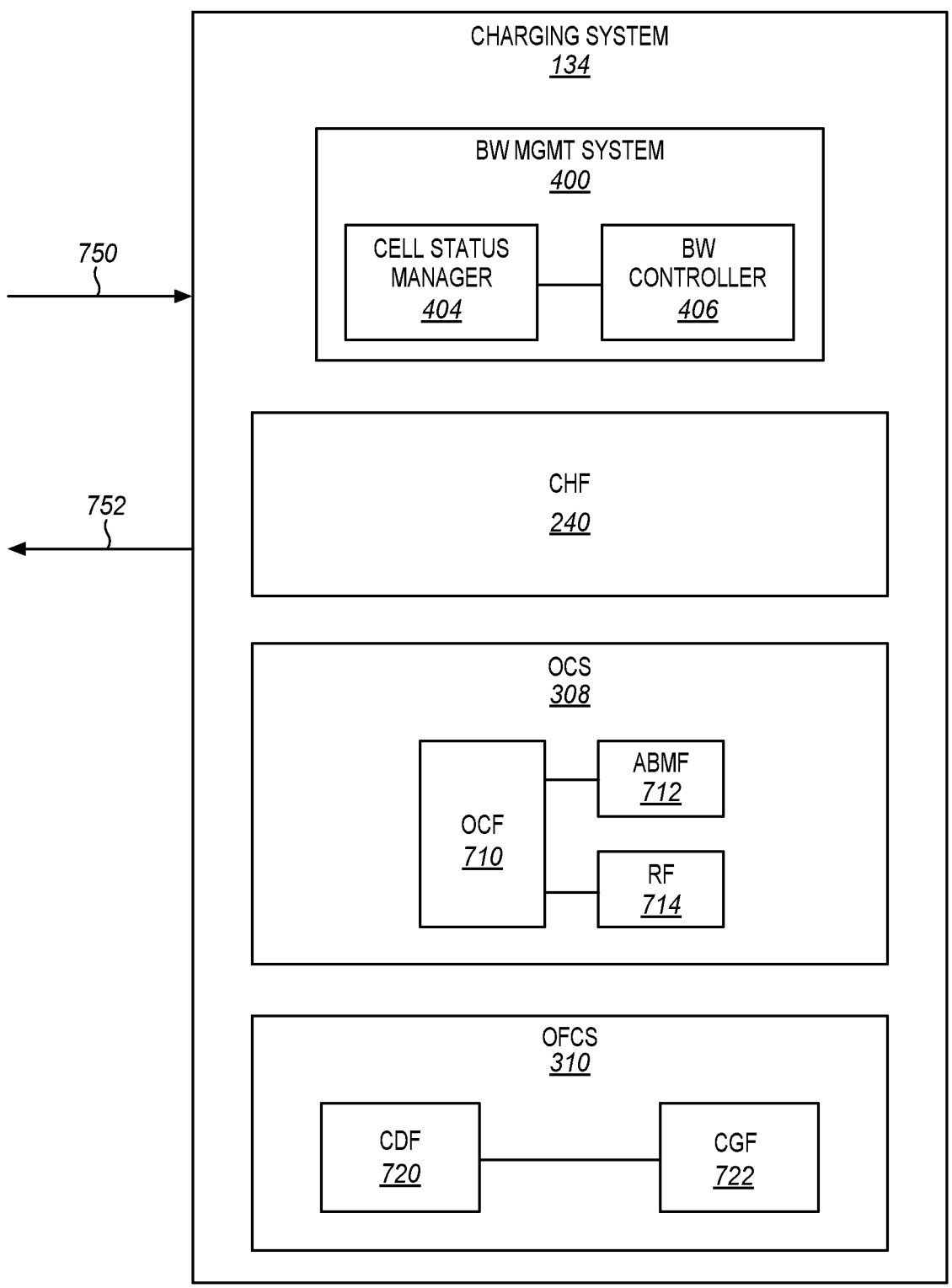
FIG. 7 is a block diagram of a charging system that includes a bandwidth management system in an illustrative embodiment.

In one embodiment, bandwidth management system 400 may be implemented in a charging system 134 of communication system 100. Thus, bandwidth throttling for UEs 110 may be provided through the charging system 134. FIG. 7 is a block diagram of a charging system 134 that includes bandwidth management system 400 in an illustrative embodiment. In this embodiment, charging system 134 may comprise a 5G CHF 240, an OCS 308, and/or an OFCS 310 as illustrated in FIG. 7. However, other types of charging systems are considered herein.

OCS 308 is configured to perform online charging, and may include or provide the following subsystems: an Online Charging Function (OCF) 710, an Account Balance Management Function (ABMF) 712, and a Rating Function (RF) 714. OCF 710 comprises circuitry, logic, hardware, means, etc., configured to control session-based and event-based charging (e.g., Session Based Charging Function (SBCF) and Event Based Charging Function (EBCF)). ABMF 712 comprises circuitry, logic, hardware, means, etc., configured to store a subscriber's account balance. RF 714 comprises circuitry, logic, hardware, means, etc., configured to determine the value of the resource usage (described in the charging event received by OCF 710) on behalf of OCF 710 according to a tariff defined by the network operator. OCF 710 furnishes the information obtained from the charging event to RF 714, and receives in return the rating output (monetary or non-monetary units). RF 714 may handle the rating of data volume, rating of session/connection time, rating of service events, etc. OCS 308 may include various other components or sub-systems not specifically illustrated in FIG. 7.

As a general description, online charging is a charging mechanism where charging information can affect, in real-time, the service rendered and therefore a direct interaction of the charging mechanism with session/service control is required. A Charging Trigger Function (CTF) in a network element sends an "initial" charging event for a service to OCS 308. OCS 308 may then authorize the start of the service after successfully performing credit control on the user's account. OCS 308 reserves credit from the user's account, and returns a quota (e.g., units specifying the number of minutes or bytes allowed) to the CTF. The CTF uses the granted quota to supervise the resource consumption for the service within the network element. When the quota is used up, the CTF either issues another "interim" charging event requesting further units to be allotted, or terminates the service. If the service is terminated at some point, the CTF reports the consumed units to OCS 308 with a "final" charging event, which can typically result in balance adjustment. Credit control for the service is then terminated, and OCS 308 returns the value of any unused quota to the user's account.

OFCS 310 is configured to perform offline charging, and may include or provide the following subsystems: a Charging Data Function (CDF) 720 and a Charging Gateway Function (CGF) 722. CDF 720 comprises circuitry, logic, hardware, means, etc., configured to receive charging events from CTFs, format the charging events into Charging Data Records (CDRs), and send the CDRs to CGF 722. CGF 722 comprises circuitry, logic, hardware, means, etc., configured to correlate CDRs for a session, and forward a CDR file with the correlated CDRs to a billing domain for subscriber billing and/or inter-operator accounting. OFCS 310 may include various other components or sub-systems not specifically illustrated in FIG. 7.

As a general description, offline charging is a process where charging information for network resource usage is collected concurrently with resource usage. Offline charging may be of two types: session-based or event-based. In event-based charging, a CTF of a network element reports the usage or the service rendered where the service offering is rendered in a single operation. For example, the CTF may report the usage in a Diameter Accounting Request (ACR) EVENT. Session-based charging is the process of reporting usage for a service, and uses the START, INTERIM, and STOP accounting data. During a service, a CTF may transmit multiple ACR Interims depending on the proceeding of the session. The charging information is then passed through logical charging functions so that CDRs or another type of charging records may be generated. The CDRs are transferred to the network operator's billing domain for subscriber billing and/or inter-operator accounting.

CHF 240 is configured to support converged online and offline charging. Thus, CHF 240 combines the functionality of OCF (Online Charging Function) and CDF (Charging Data Function).

Figure 8:
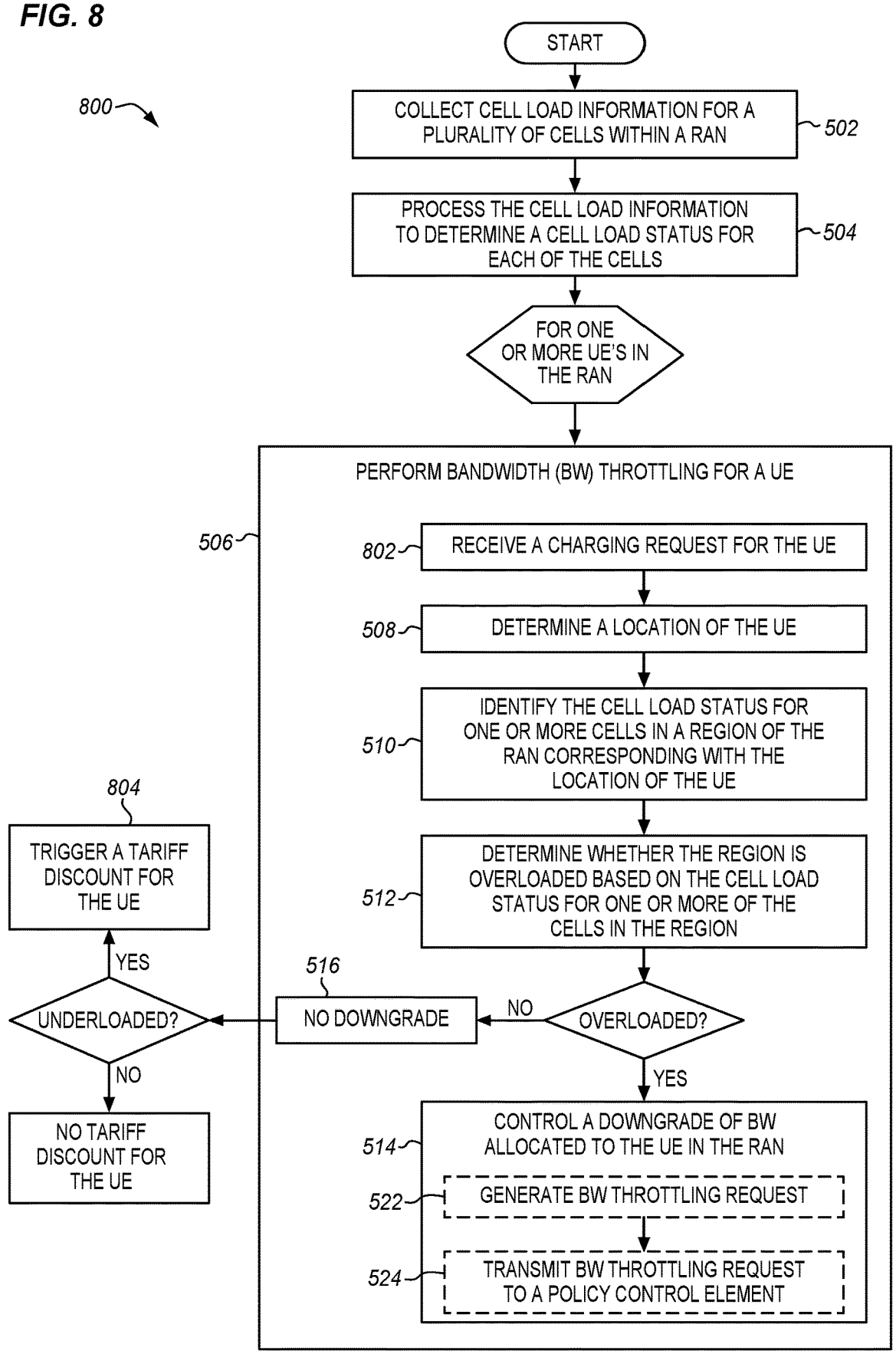
FIG. 8 is a flow chart illustrating a method of managing bandwidth allocated to a UE as performed in a charging system in an illustrative embodiment.

FIG. 8 is a flow chart illustrating a method 800 of managing bandwidth allocated to a UE 110 as performed in a charging system in an illustrative embodiment. Method 800 includes similar steps as method 500 described above, and the same reference numbers will be used for these steps. In this embodiment, cell status manager 404 of bandwidth management system 400 collects cell load information 410 for a plurality of cells 124 within the RAN 120 (step 502), and processes the cell load information 410 to determine a cell load status 412 for each of the cells 124 (step 504). Bandwidth controller 406 of bandwidth management system 400 performs bandwidth throttling for a UE 110 attached to or served by RAN 120 based on the cell load status 412 of the cells 124 (step 506). In this embodiment, bandwidth throttling is triggered upon receipt of a charging request 750 for UE 110 (step 802). The charging request 750 may be an "initial" charging request for a new data session of the UE 110, may be an "interim" charging request for an ongoing data session of the UE 110, etc. For example, when a data session is started, a 4G P-GW 306 sends a Diameter Credit Control Request [initial] (Gy CCR-i) to OCS 308, a 5G SMF 216 sends a Data Charging Request[initial] to CHF 240, etc.

In response to receiving the charging request 750, bandwidth controller 406 determines a location of the UE 110 (step 508). In one embodiment, bandwidth controller 406 may obtain the location of the UE 110 from the charging request. The charging request contains the user location information that allows for determining the tracking area code and cell identity. For example, a Diameter CCR includes an Attribute Value Pair (AVP) (i.e., 3GPP-User-Location-Information), which indicates the origin zone where the UE 110 is initiating the data session. This AVP allows indicates the geographic location with the granularity up to cell identity. For example, the 3GPP-User-Location-Information AVP contains:

Mobile Country Code (MCC)
Mobile National Code (MNC)
Tracking Area Code (TAC)
E-UTRAN Cell Identifier (ECI)

In another example, a "User Location Info" field is defined in 5G under "PDU Session Charging Information" sent over the charging interface (Nchf) interface (N40) between SMF 216 and CHF 240. This user location information includes at least one parameter (e.g., eutraLocation, nrLocation, n3gaLocation) that indicates a tracking area identity (TAI) and cell identity (ECGI) where the UE 110 is located, as well as the global identity of the eNodeB (globalENbI) or gNodeB (globalNgenbId) in which the UE 110 is currently located.

Figure 9:
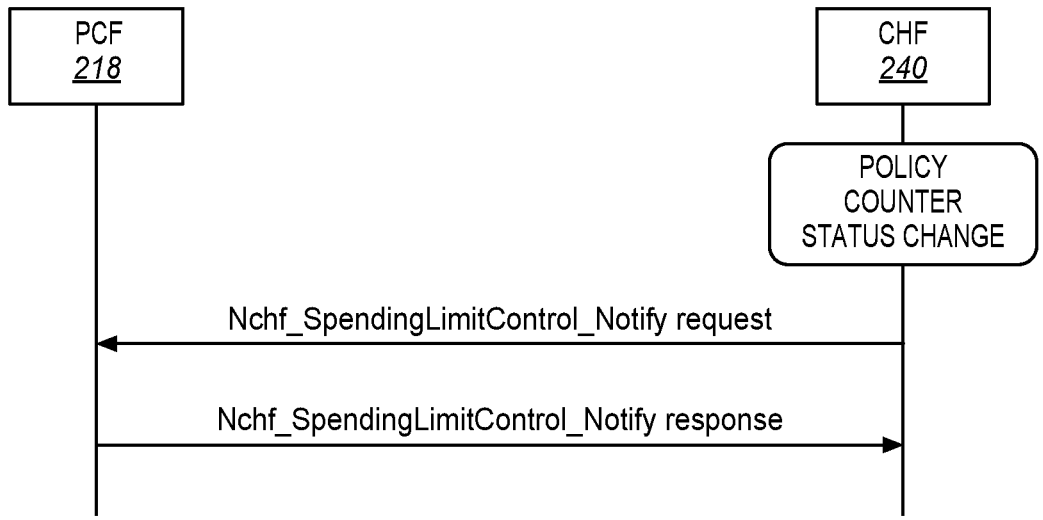
FIGS. 9-10 are message diagrams illustrating an interaction between a CHF and PCF in illustrative embodiments.
Figure 10:
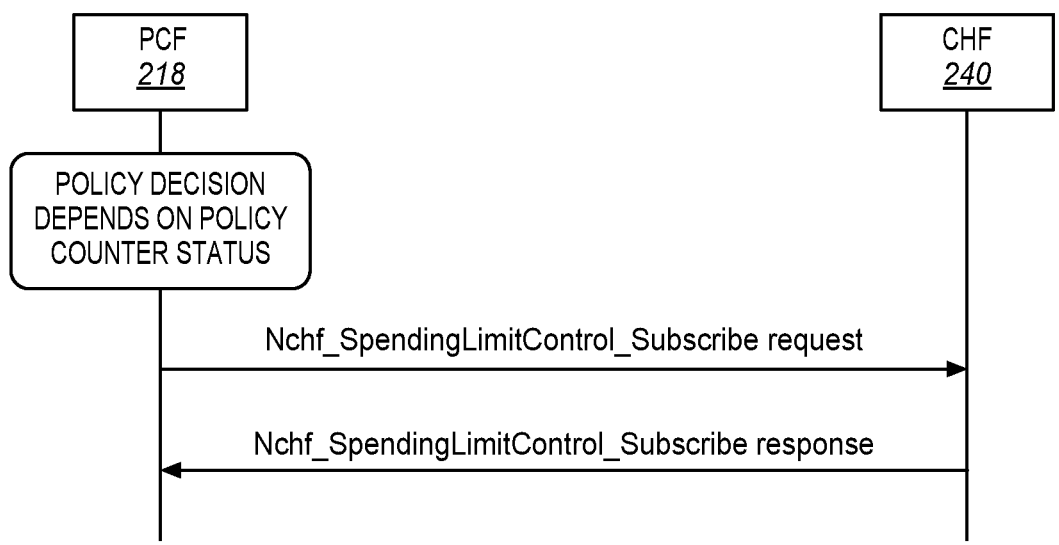

Bandwidth controller 406 then identifies the cell load status 412 for one or more of the cells 124 in a region 610 of the RAN 120 corresponding with the location of the UE 110 (step 510). Bandwidth controller 406 determines whether the region 610 corresponding with the location of the UE 110 is overloaded based on the cell load status 412 for one or more of the cells 124 in the region 610 (step 512). When the region 610 is determined to be overloaded, bandwidth controller 406 controls a downgrade of the bandwidth allocated to the UE 110 in the RAN 120 (step 514). For example, bandwidth controller 406 generates a bandwidth throttling request 752 to downgrade the bandwidth allocated to the UE 110 (optional step 522), and transmits the bandwidth throttling request 752 to a policy control element 132 (optional step 524). For example, bandwidth controller 406 may transmit the bandwidth throttling request 752 via the N28 reference point to the PCF 218 of a next-generation network. FIGS. 9-10 are message diagrams illustrating an interaction between a CHF 240 and PCF 218 in illustrative embodiments. In FIG. 9, CHF 240 is configured to notify PCF 218 when a change is made to the policy counter status. Thus, when bandwidth controller 406 determines that region 610 is overloaded, it sets the policy counter defined for location-load-status to "overloaded", and transmits a bandwidth throttling request 752 to PCF 218 in the form of an Nchf_SpendingLimitControl_Notify request over N28 reference point. PCF 218 responds with a Nchf_SpendingLimitControl_Notify response. In FIG. 10, PCF 218 subscribes to a policy counter from CHF 240. Thus, PCF 218 sends a subscribe request to CHF 240 in the form of a Nchf_SpendingLimitControl_Subscribe request over the N28 reference point. When bandwidth controller 406 determines that region 610 is overloaded, it sets the policy counter defined for location-load-status to "overloaded", and transmits a bandwidth throttling request 752 to PCF 218 in the form of an Nchf_SpendingLimitControl_Subscribe response over N28 reference point.

In another example, bandwidth controller 406 may transmit the bandwidth throttling request 752 as a Diameter CCR or a Credit Control Answer (CCA) via the Sy reference point to a PCRF 302 of an LTE network. In yet another example, bandwidth controller 406 may transmit the bandwidth throttling request 752 as a Diameter ACR or Accounting Answer (ACA) via the Gz reference point to a PCRF 302 of an LTE network. In response to the bandwidth throttling request 752, the policy control element 132 may change the policy 136 or make a policy decision for the UE 110 so that the bandwidth allocated to the UE 110 in the RAN 120 is reduced.

When region 610 is not overloaded, bandwidth controller 406 may not downgrade the bandwidth allocated to the UE 110 (step 516). Also, bandwidth controller 406 may determine whether region 610 is underloaded. For example, bandwidth controller 406 may identify the cell load status 412 for the cell 124 as a load level (e.g., integer between "1-9"), as a classification (e.g., "overloaded", "normal", or "underloaded"), or as another value. When the load level of the cell 124 is below the overload threshold or below an underload threshold, the classification of the cell 124 indicates "underloaded", or cell 124 is otherwise indicated as underloaded, bandwidth controller 406 may determine that region 610 is underloaded. When region 610 is considered underloaded, bandwidth controller 406 may trigger a tariff discount for the UE 110 (step 804). Thus, UE 110 may experience a lower tariff as a benefit for being located in an underloaded region 610 of RAN 120.

Although bandwidth management system 400 was illustrated as part of charging system 134 in FIG. 7, bandwidth management system 400 may be implemented in other elements of communication system 100. For example, bandwidth management system 400 may be implemented in an AMF 214, SMF 216, or another element of a next generation network. Bandwidth management system 400 may be implemented in a P-GW 306, PCEF 304, or another element of an LTE network. Bandwidth management system 400 may also be a standalone service that is interrogated by a charging system 134, a policy control element 132, or another network element.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

As used in this application, the term "circuitry" may refer to one or more or all of the following:
  (a) hardware-only circuit implementations (such as implementations in only analog and/or digital circuitry);
  (b) combinations of hardware circuits and software, such as (as applicable):
    (i) a combination of analog and/or digital hardware circuit(s) with software/firmware; and
    (ii) any portions of hardware processor(s) with software (including digital signal processor(s)), software, and memory(ies) that work together to cause an apparatus, such as a mobile phone or server, to perform various functions); and
  (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Although specific embodiments were described herein, the scope of the disclosure is not limited to those specific embodiments. The scope of the disclosure is defined by the following claims and any equivalents thereof.

What is claimed is:

1. A bandwidth management system comprising:
  at least one processor; and
  at least one memory storing instructions that, when executed by the at least one processor cause the bandwidth management system at least to:
    collect cell load information for a plurality of cells within a Radio Access Network (RAN);
    process the cell load information to determine a cell load status for each of the cells; and
    perform bandwidth throttling by:
      receiving a message regarding User Equipment (UE) of a user of the RAN;
      determining a location of the UE;
      identifying a region of interest corresponding with the location of the UE that includes multiple cells of the RAN;
      identifying the cell load status for each of the cells in the region of interest;
      determining that the region of interest is overloaded when a threshold number of the cells in the region of interest are overloaded based on the cell load status for the cells in the region of interest; and
      controlling a downgrade of bandwidth allocated to the UE when the region of interest is overloaded.

2. The bandwidth management system of claim 1 wherein the instructions when executed by the at least one processor further cause the bandwidth management system at least to:
  generate a bandwidth throttling request requesting a change to a policy for the UE to downgrade the bandwidth allocated to the UE; and
  transmit the bandwidth throttling request to a policy control element.

3. The bandwidth management system of claim 1 wherein:
  the bandwidth management system is implemented in a charging system configured to perform charging for sessions of users of the RAN; and
  the instructions when executed by the at least one processor further cause the bandwidth management system at least to:
    perform the bandwidth throttling for the UE responsive to receiving a charging request for the UE.

4. The bandwidth management system of claim 3 wherein the instructions when executed by the at least one processor further cause the bandwidth management system at least to:
  perform the bandwidth throttling for the UE responsive to receiving an initial charging request for a new data session of the UE.

5. The bandwidth management system of claim 3 wherein the instructions when executed by the at least one processor further cause the bandwidth management system at least to:
  perform the bandwidth throttling for the UE responsive to receiving an interim charging request for an ongoing data session of the UE.

6. The bandwidth management system of claim 3 wherein the instructions when executed by the at least one processor further cause the bandwidth management system at least to:
  trigger a tariff discount for the UE when the region of interest is underloaded.

7. The bandwidth management system of claim 3 wherein:
  the charging system comprises a 5G Charging Function (CHF) of a 5G network.

8. The bandwidth management system of claim 3 wherein:
  the charging system comprises an Online Charging System (OCS) of an LTE network.

9. The bandwidth management system of claim 3 wherein:
  the charging system comprises an Offline Charging System (OFCS) of an LTE network.

10. A method of managing bandwidth within a Radio Access Network (RAN), the method comprising:
  collecting cell load information for a plurality of cells within the RAN;
  processing the cell load information to determine a cell load status for each of the cells; and
  performing bandwidth throttling by:
    receiving a message regarding User Equipment (UE) of a user of the RAN;
    determining a location of the UE;
    identifying a region of interest corresponding with the location of the UE that includes multiple cells of the RAN;

identifying the cell load status for each of the cells in the region of interest;

determining that the region of interest is overloaded when a threshold number of the cells in the region of interest are overloaded based on the cell load status for the cells in the region of interest; and controlling a downgrade of bandwidth allocated to the UE when the region of interest is overloaded.

11. The method of claim 10 wherein controlling the downgrade of bandwidth allocated to the UE comprises:

generating a bandwidth throttling request requesting a change to a policy for the UE to downgrade the bandwidth allocated to the UE; and transmitting the bandwidth throttling request to a policy control element.

12. The method of claim 10 wherein:

the bandwidth throttling is performed at a bandwidth management system that is implemented in a charging system configured to perform charging for sessions of users of the RAN; and performing the bandwidth throttling comprises performing the bandwidth throttling for the UE responsive to receiving a charging request for the UE.

13. The method of claim 12 wherein:

performing the bandwidth throttling comprises performing the bandwidth throttling for the UE responsive to receiving an initial charging request for a new data session of the UE.

14. The method of claim 12 wherein:

performing the bandwidth throttling comprises performing the bandwidth throttling for the UE responsive to receiving an interim charging request for an ongoing data session of the UE.

15. The method of claim 12 further comprising:

triggering a tariff discount for the UE when the region of interest is underloaded.

16. A non-transitory computer readable medium embodying programmed instructions executed by a processor, wherein the instructions direct the processor to implement a method of managing bandwidth within a Radio Access Network (RAN), the method comprising:

collecting cell load information for a plurality of cells within the RAN;

processing the cell load information to determine a cell load status for each of the cells; and performing bandwidth throttling by:

receiving a message regarding User Equipment (UE) of a user of the RAN;

determining a location of the UE;

identifying a region of interest corresponding with the location of the UE that includes multiple cells of the RAN;

identifying the cell load status for each of the cells in the region of interest;

determining that the region of interest is overloaded when a threshold number of the cells in the region of interest are overloaded based on the cell load status for of the cells in the region of interest; and controlling a downgrade of bandwidth allocated to the UE when the region of interest is overloaded.

17. The computer readable medium of claim 16 wherein controlling the downgrade of bandwidth allocated to the UE comprises:

generating a bandwidth throttling request requesting a change to a policy for the UE to downgrade the bandwidth allocated to the UE; and transmitting the bandwidth throttling request to a policy control element.

18. The computer readable medium of claim 16 wherein:

the bandwidth throttling is performed at a bandwidth management system that is implemented in a charging system configured to perform charging for sessions of users of the RAN; and performing the bandwidth throttling comprises performing the bandwidth throttling for the UE responsive to receiving a charging request for the UE.

19. The computer readable medium of claim 18 wherein:

performing the bandwidth throttling comprises performing the bandwidth throttling for the UE responsive to receiving an initial charging request for a new data session of the UE.

20. The computer readable medium of claim 18 wherein:

performing the bandwidth throttling comprises performing the bandwidth throttling for the UE responsive to receiving an interim charging request for an ongoing data session of the UE.

* * * * *